United States Patent [19]

Dunn

[11] Patent Number: 4,982,199
[45] Date of Patent: Jan. 1, 1991

[54] METHOD AND APPARATUS FOR GRAY SCALE PRINTING WITH A THERMAL INK JET PEN

[75] Inventor: John B. R. Dunn, Corvallis, Oreg.

[73] Assignee: Hewlett-Packard Company, Palo Alto, Calif.

[21] Appl. No.: 420,604

[22] Filed: Oct. 4, 1989

Related U.S. Application Data

[63] Continuation of Ser. No. 285,836.

[51] Int. Cl.$^5$ ............................................. G01D 15/18
[52] U.S. Cl. .................................. 346/1.1; 346/140 R
[58] Field of Search ........................... 346/1.1, 140 PD

[56] References Cited

U.S. PATENT DOCUMENTS

| 4,251,824 | 2/1981 | Hara et al. | 346/140 PD |
| 4,296,421 | 10/1981 | Hara et al. | 346/140 R |
| 4,313,124 | 1/1982 | Hara | 346/140 R |
| 4,313,684 | 2/1982 | Tazaki et al. | 346/140 PD X |
| 4,490,728 | 12/1984 | Vaught et al. | 346/140 PD X |
| 4,494,128 | 1/1985 | Vaught | 346/140 R |
| 4,499,479 | 2/1985 | Lee et al. | 346/140 R |
| 4,503,444 | 3/1985 | Tacklind | 346/140 PD |
| 4,580,149 | 4/1986 | Domoto et al. | 346/140 PD |
| 4,646,110 | 2/1987 | Ikeda et al. | 346/140 PD |
| 4,710,784 | 12/1987 | Nakayama | 346/140 PD |
| 4,723,129 | 2/1988 | Endo et al. | 346/140 PD X |

OTHER PUBLICATIONS

Durbeck, Robert C. et al., "Ink Jet Printing", *Output Hardcopy Devices*, Academic Press, Inc., 1988., Chapter 13, pp. 311-370.

Primary Examiner—George H. Miller, Jr.

[57] ABSTRACT

The firing resistor in a thermal ink jet pen is driven by two signals in sequence. The first signal is a warming signal, tailored to transfer a desired quantity of thermal energy to the ink in the firing nozzle. The second signal is a firing pulse tailored to vaporize ink adjacent the resistor and thereby eject a bubble of ink from the nozzle. The prewarming of the ink achieved by the warming pulse increases the volume of the vapor bubble produced by the firing pulse, thereby yielding a commensurately larger ink droplet. By varying the degree of prewarming, the droplets ejected by the firing pulse can be varied in volume, thereby effecting gray scale printing.

10 Claims, 2 Drawing Sheets

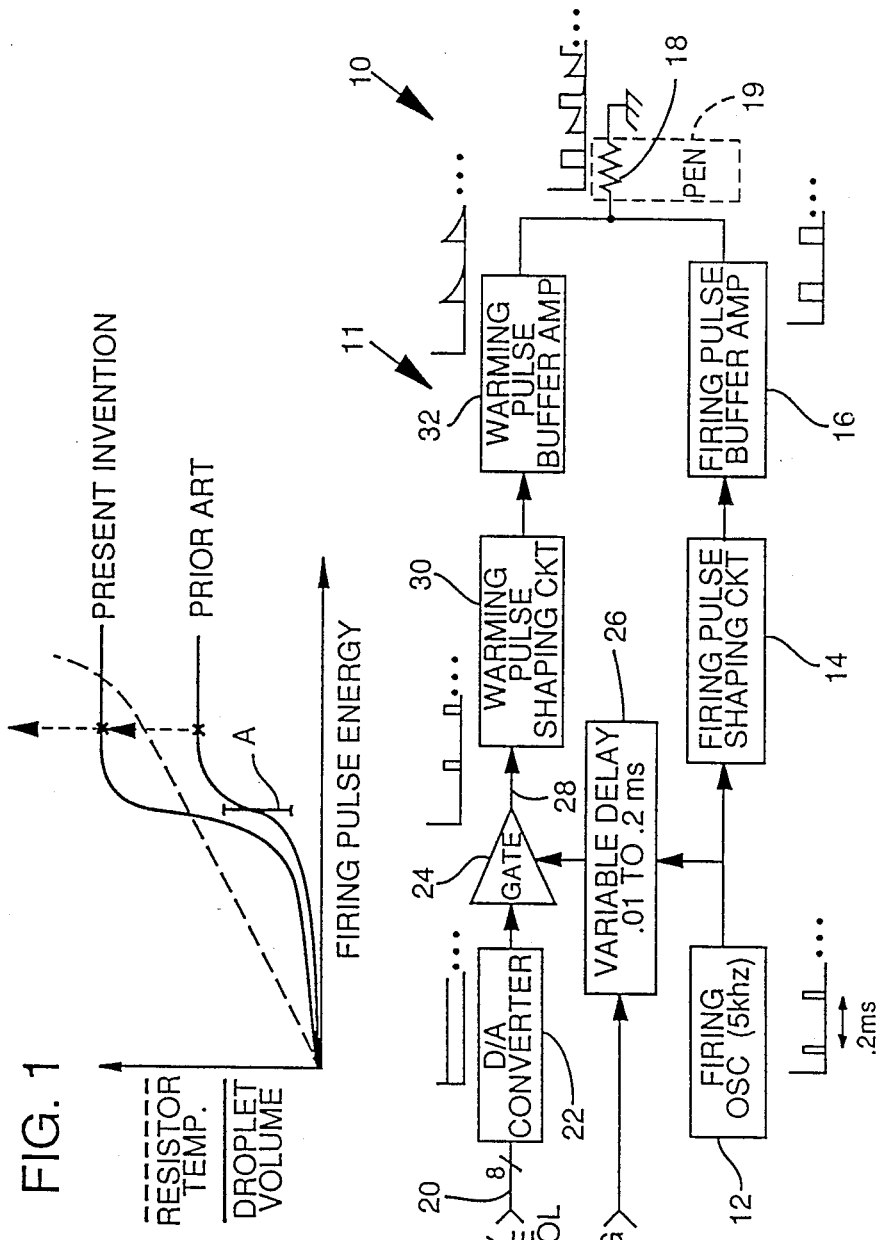

METHOD AND APPARATUS FOR GRAY SCALE PRINTING WITH A THERMAL INK JET PEN

This application is a continuation of application Ser. No. 07/285,836, filed Dec. 16, 1988, now abandoned.

FIELD OF THE INVENTION

The present invention relates to thermal ink jet printing systems, and more particularly to a method and apparatus for gray scale printing with such systems.

BACKGROUND AND SUMMARY OF THE INVENTION

Thermal ink jet printers are well known in the art and are illustrated, for example, in U.S. Pat. Nos. 4,490,728, 4,313,124 and 4,296,421. In such printers, a thin film resistor in an ink drop generator is heated and causes sudden vaporization of a small portion of the ink. The rapidly expanding ink vapor displaces ink from a nozzle, causing drop ejection. The ejected drops collect onto a page to form printed characters.

The utility of such printers has been inhibited because of the difficulty involved in achieving gray scale printing.

U.S. Pat. No. 4,503,444 proposes one technique for achieving gray scale printing. In the disclosed system, the thin film firing resistor is provided with several electrical firing pulses in rapid succession (termed a "packet"). The individual droplets formed by the pulses merge in flight to create a single drop. The drop volume, and thus the resulting gray scale, can be varied by varying the number of pulses in the packet.

In an alternative system, disclosed in U.S. Pat. No. 4,746,935, an ink jet pen is provided with three drop generators which produce drops of different volumes, weighted in binary relationship. By firing various combinations of the drop generators at a given pixel on the printing medium, eight levels of print density can be achieved.

In still another system, disclosed in copending application Ser. No. 899,447 of Taub and assigned to the present assignee, ink jet gray scaling is achieved by merging ink droplets on the printing medium while still wet. The rate at which droplets are ejected is varied to vary the print density.

The foregoing techniques all rely on the convergence of a plurality of droplets, either in flight or on the printing medium, to yield variations in gray scale. While these techniques achieve the desired results, they do so with certain attendant drawbacks, such as accelerated burnout of the firing resistor due to electromigration.

Other techniques for achieving gray scaling have been proposed which rely on the ejection of ink droplets of varying volumes, such as by varying the amplitudes or durations of the firing pulses. However, these techniques have generally not met with success.

It is an object of the present invention to provide a gray scale printing technique that does not rely on the firing of multiple droplets to achieve gray scaling.

It is a more particular object of the present invention to vary printed gray scale by varying the volume of droplets ejected from the pen.

It is still another more particular object of the present invention to vary printed gray scale by preceding the firing pulse with a warming pulse to warm the ink in accordance with the degree of gray scaling desired.

According to one embodiment of the present invention, the firing resistor in an ink jet pen is driven by two signals in sequence. The first signal is a warming signal, tailored to transfer a desired quantity of thermal energy to the ink in the firing nozzle. The second signal is a firing pulse tailored to vaporize ink adjacent the resistor and thereby eject a bubble of ink from the nozzle. The warming pulse serves to warm the ink in the nozzle and thereby increase the volume of the vapor bubble produced by the firing pulse. By varying the characteristics of the warming pulse, the droplets ejected by the firing pulse can be varied in volume, thereby effecting gray scale printing.

The foregoing and additional objects, features and advantages of the present invention will be more readily apparent from the following detailed description, which proceeds with reference to the accompanying drawings.

BRIEF DESCRIPTION OF THE DRAWINGS

FIG. 1 is a chart illustrating the relationships between firing pulse energy and droplet volume for prior art pens and for pens according to the present invention.

FIG. 2 is a block diagram of an apparatus according to one embodiment of the present invention.

DETAILED DESCRIPTION

Figure 3A:
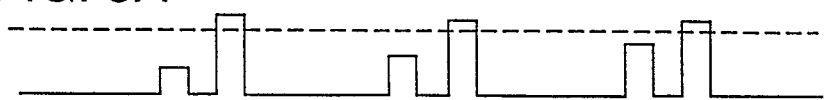
FIGS. 3A–3G illustrate exemplary waveforms that may be applied to the firing resistor in the apparatus of FIG. 2.

In an exemplary thermal bubble ink jet pen, a capillary tube draws ink from an ink reservoir into a firing nozzle. In the firing nozzle, a portion of the ink is superheated by application of a firing pulse to a firing resistor, causing a vapor bubble to rapidly grow on the surface of the resistor. The rapid growth of this bubble expels the ink above the bubble out a print orifice and towards the printing medium.

The behavior of the bubble in the firing chamber is complex and a description thereof is beyond the scope of this disclosure. However, the phenomenon is described in "Output Hardcopy Devices," edited by R. Durbeck, Academic Press, 1988, pp. 336–345 and in Hewlett-Packard Journal, Vol. 36, No. 5, May, 1985, pp. 21–27.

In a typical pen, the firing resistor may be energized with a pulse of 25 volts having a duration of 5 microseconds. After a short delay to permit the firing chamber to refill with ink from the capillary tube and stabilize, the pen can be fired again. The interval between firings is typically 200 to 800 microseconds.

FIG. 1 shows the relationship between energy applied to the firing resistor and the resultant droplet volume. As can be seen, the droplet volume is quite small (often zero) for low firing energies and then increases rapidly over a short portion of the curve before levelling out at high firing energies. The level curve at the high firing energies is due to the insulative properties of the vapor bubble. Once a vapor bubble begins to form, further heat transfer to the ink is essentially interrupted, limiting the maximum bubble size and thus the maximum droplet volume. (This insulative quality also causes the resistor temperature to rise at an accelerated rate at high firing energies since conduction of heat away from the resistor is interrupted.)

As further shown by the FIG. 1 prior art curve, within a narrow, middle range of firing energies, droplet volume increases rapidly with small variations in firing energy. This phenomenon could be exploited to produce gray scaling if the phenomenon was reliably repeatable (i.e. by modulating the firing energy within this range to achieve differing droplet volumes). Unfortunately, it is not. The curve in this range has a wide standard deviation, as shown by the bracket labelled "A". Thus, while one droplet produced at a certain energy in this range may have one volume, another droplet produced at the same energy may have a volume that differs considerably from the first.

Since the droplet volume is not reliably constant over this steeply sloped portion of the curve, pens are typically operated well above this range, in the level part of the curve where the standard deviation is greatly reduced. By operating in this upper range, the droplet volume remains predictably constant. The prior art curve is marked with an "X" at a representative operating point, which may provide 25 to 60 percent more energy to the firing resistor than is theoretically needed. By overpowering the resistor in this manner, variations in printer performance due to changes in ambient temperature and processing tolerances, such as passivation thickness of the thin film firing resistor, are minimized.

To obtain predictable variations in droplet volume so as to achieve gray-scaling, the present invention warms the ink in the firing nozzle prior to the firing pulse. By prewarming the ink, more of the ink in the nozzle is brought to the vaporization temperature by the firing pulse before its heating is interrupted by the formation of the vapor bubble. By vaporizing more of the ink, a larger ink droplet is ejected. The precise size of the ink droplet is controlled by controlling the quantity of heat transferred to the ink during this prewarming operation, thereby achieving predictable gray scaling.

FIG. 1 shows a second curve, above the first, representing variation in droplet volume as a function of firing energy when the ink in the firing chamber has been prewarmed. As can be seen, this second curve has the same basic characteristics as the prior art curve, but is shifted upwardly, reflecting larger droplet volumes.

It should be noted that this second curve illustrates only one prewarming condition. If the ink is prewarmed to a higher temperature, a curve above the one illustrated will result. If the ink is prewarmed to a lower temperature, a curve below the one illustrated will result. The actual volume of the droplet produced again depends on the magnitude of the firing pulse. Again, the magnitude of the firing pulse is desirably selected to be well up on the level portion of the curve so that reliably repeatable droplet volumes are produced. To vary droplet volumes, the degree of prewarming is varied, resulting in different curves.

A warming pulse that increases the temperature of the ink in the nozzle to 60 degrees Centigrade has been found to produce droplets having three times the volume of corresponding droplets produced with ink at ambient temperature. Droplet volumes greater than this 3× droplet size can be achieved by increasing the ink temperature to more than 60 degrees (although care must be taken that the ink is not warmed to the boiling point, typically about 100 degrees Centigrade). Similarly, droplet volumes less than this 3× droplet size can be achieved by raising the ink temperature less than this 60 degree figure.

(While, for simplicity's sake, the same magnitude firing pulse is used in the present invention as in the prior art, the present invention can be practiced with a smaller firing pulse. The prewarming of the ink results in its more consistent nucleation and reduces the effect of ambient temperature on pen performance. This permits the pen to be reliably fired without the substantial overpowering that is used in the prior art to minimize the variability in performance due to these factors.)

In designing printing systems utilizing the present invention, it should be recognized that the larger droplets produced by prewarming of the ink must be replaced by a correspondingly larger volume of ink drawn through the capillary tube to the firing nozzle during the refill interval. Consequently, the refill interval is somewhat longer in pens according to the present invention than in the prior art pens and is variable on the degree of prewarming.

Figure 3B:
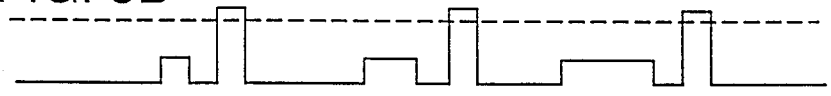
Figure 3C:
Figure 3D:
Figure 3E:
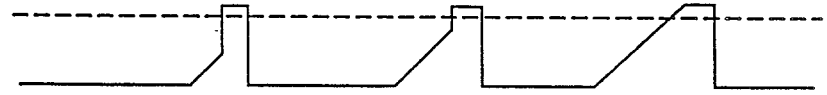
Figure 3F:
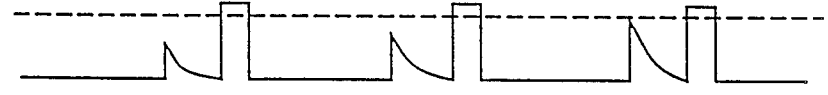
Figure 3G:
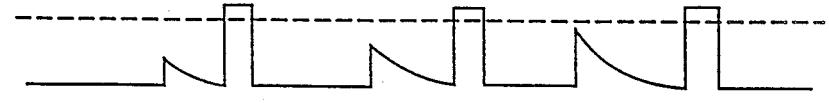

In the preferred form of the present invention, the prewarming of ink in the firing chamber is achieved by applying an electrical warming pulse signal to the firing resistor prior to the firing pulse signal. The warming pulse can take any of myriad forms, such as a square pulse, a ramp, an exponential curve, etc., or repetitive combinations of any of these. Exemplary waveforms are shown in FIGS. 3A–3G (not to scale). Similarly, the warming pulse can occur within a wide range of time intervals before the firing pulse, and may even transition into the firing pulse without returning to zero. The greater the time interval between the warming pulse and the firing pulse, the greater the heat loss from the ink by conduction, etc.

Often, a desired prewarming effect can be achieved by several entirely different warming pulses, such as a large rectangular pulse several tens of microseconds before the firing pulse or a commensurately smaller ramp warming pulse just a few microseconds before the firing pulse.

The prewarming pulse is preferably of short duration so that heat produced thereby does not have time to diffuse into adjacent ink still in the capillary feed tube and change its temperature, or raise the temperature of the substrate. Such parasitic heating introduces an undesirable offset into the gray scale which should be avoided by maintaining the ink outside the firing nozzle, as well as the pen itself, near ambient temperature.

FIG. 2 shows a an ink jet printing system 10 that includes a simple waveform generator 11 for practicing the present invention. A firing oscillator 12 produces an output signal every 200 microseconds, corresponding to a pen firing rate of 5000 droplets per second. This signal is applied to a firing pulse shaping circuit 14 which generates the desired firing pulse waveform. This signal is in turn fed to a firing pulse buffer amplifier 16 which drives the firing resistor 18 in the ink jet pen 19.

An eight bit gray scale signal is applied from a printer controller (not shown) to waveform generator 11 on an input line 20. This signal is converted to an analog equivalent by an D/A converter 22 and is applied to the input of a gating circuit 24. Gating circuit 24 is gated on by a delayed version of the firing oscillator signal, provided by a variable delay stage 26 whose delay is controlled by a warming pulse offset signal supplied by the printer controller. The gating circuit 24 and delay stage 26 cooperate to provide to line 28 a series of pulses delayed a desired interval behind the firing pulses and having magnitudes related to the gray scale signal. The delay is set so that the gray scaling signal occurs a desired interval before the next firing pulse. This delayed gray scale signal is again shaped as desired by a warming pulse shaping circuit 30 and buffered by a warming pulse buffer amplifier 32 before being applied to the firing resistor 18. The superposition of the warming pulse and firing pulse signals applied to the firing resistor 18 yields the desired two component waveform.

It should be noted that while the firing pulses shown in the figures are illustrated as being rectangular, there are a great variety of other firing waveforms known to the art that can readily be used in place of those illustrated. Similarly, while the firing pulses are shown as being invarient from one cycle to the next, in other embodiments it may be desirable to vary the character of these pulses over time.

Compared to the multi-drop techniques for gray-scaling known in the prior art, the present invention achieves an improved print quality while producing droplets at a slower rate. (Alternatively, the invention can produce droplets at the same rate and complete the printing job more quickly). Resistor life is also extended as there is less cavitation due to fewer droplets per resistor.

As in the prior art, the printhead is desirably provided with a heatsink to prevent the ambient temperature of the ink in the pen from rising unduly during prolonged printing operations.

Having illustrated the principles of my invention with reference to a preferred embodiment and several variations thereof, it should be apparent that the invention can be modified in arrangement and detail without departing from such principles. For example, while the invention has been described as using the firing resistor for the prewarming operation, in alternative embodiments, additional resistive heating elements can be used for this purpose. Similarly, while the invention has been described as employing a resistive element to prewarm the ink, the same result could be achieved by employing a solid state cooling element to vary the ink temperature a desired degree below ambient. Finally, it should be recognized that the prewarming may be controlled either in response to the data (typically an image) being printed, or it may be set independently, as by a user-adjustable control.

In view of the wide range of embodiments to which the principles of the present invention can be applied, it should be understood that the methods and apparatus described should be considered as illustrative only and not as limiting the scope of the invention. Instead, my invention is to include all such embodiments as may come within the scope and spirit of the following claims and equivalents thereto.

I claim:

1. In a method of operating an ink jet pen that includes the step of providing to a firing resistor a waveform that includes a precursor pulse and a firing pulse, an improvement comprising the steps:
   providing a time-varying gray-scaling signal; and
   varying the precursor pulse from one waveform to the next in response to variations in said gray-scaling while maintaining the firing pulse constant from one waveform to the next, wherein ink droplets of different sizes are produced by said pen.

2. A method of operating an ink jet pen to produce a first ink droplet of a first volume and a second ink droplet of a second, different volume, said second ink droplet being produced immediately following the first, the ink jet pen including a firing resistor in a firing chamber, the method comprising the steps:
   transferring ink to the firing chamber;
   transferring a first quantity of thermal energy to the ink in the firing chamber;
   applying a firing pulse to the firing resistor to thereby expel a droplet of ink from the firing chamber;
   transferring more ink to the firing chamber;
   transferring a second quantity of thermal energy to the ink in the firing chamber, said second quantity being different from the first; and
   applying a second firing pulse to the firing resistor to thereby expel a second droplet of ink;
   wherein the variation between the first and second quantities of thermal energy transferred to the ink yields a variation in the volume of the ink droplets.

3. The method of claim 2 which further comprises:
   providing to the firing resistor a first warming waveform followed by a first firing waveform; and, after transferring more ink to the firing chamber:
   providing to the firing resistor a second warming waveform followed by a second firing waveform, wherein said second warming waveform is different than said first warming waveform.

4. The method of claim 3 in which said second firing waveform is identical to said first firing waveform.

5. The method of claim 3 in which the second warming waveform is of a different magnitude than the first warming waveform.

6. The method of claim 3 in which the second warming waveform is of a different duration than the first warming waveform.

7. The method of claim 3 in which the second warming waveform is comprised of a plurality of component signals and in which the second warming waveform is comprised of a different plurality of component signals.

8. The method of claim 3 in which the first and second warming waveforms both return to zero before the firing waveforms begin.

9. The method of claim 3 in which neither the first nor the second warming waveforms return to zero before the firing waveforms begin.

10. An ink jet printing system, comprising: a thermal ink jet pen having a firing resistor;
   a waveform generator, said waveform generator repetitively providing to said firing resistor a waveform comprised of a warming signal and a firing signal; and
   means for varying the warming signal of said waveform but not the firing signal thereof, so as to effect variations in printed gray scale, said means comprising means for producing ink droplets of different sizes from said pen.

* * * * *

UNITED STATES PATENT AND TRADEMARK OFFICE
CERTIFICATE OF CORRECTION

PATENT NO. : 4,982,199

DATED : January 1, 1991

INVENTOR(S) : John B.R. Dunn

It is certified that error appears in the above—identified patent and that said Letters Patent is hereby corrected as shown below:

Column 5, line 60, "gray-scaling while" should be --gray-scaling signal while--.

Signed and Sealed this

Thirteenth Day of October, 1992

Attest:

DOUGLAS B. COMER

*Attesting Officer*  Acting Commissioner of Patents and Trademarks